United States Patent [19]
Foote et al.

[11] 4,187,389
[45] Feb. 5, 1980

[54] SHIELDED ELECTRICAL CONDUCTOR TERMINATIONS AND METHODS OF MAKING SAME

[75] Inventors: George A. Foote, Kendall Park; Mason M. Lindamood, Basking Ridge; Robert D. Fulcomer, Milford, all of N.J.

[73] Assignee: Sola Basic Industries, Inc., Milwaukee, Wis.

[21] Appl. No.: 771,658

[22] Filed: Feb. 24, 1977

Related U.S. Application Data

[63] Continuation of Ser. No. 567,440, Apr. 11, 1975, abandoned.

[51] Int. Cl.² .............. H02G 15/02; H02G 1/14; B32B 7/00; H01B 1/04
[52] U.S. Cl. .................. 174/73 R; 156/53; 252/504; 252/511; 260/42.33; 428/331; 428/356; 428/377; 428/517; 428/519; 428/539
[58] Field of Search .............. 174/68 A, 73 R, 73 SC, 174/84 R, 102 SC, 105 SC, 106 SC, 120 SC, 127; 310/196; 29/592, 624, 628; 156/47, 51–53, 56; 252/504, 511, 516; 260/42.26, 42.33, 42.37, 42.57; 428/331, 402, 538, 539

[56] References Cited

U.S. PATENT DOCUMENTS

| 3,349,164 | 10/1967 | Wyatt | 174/73 R |
| 3,412,200 | 11/1968 | Virsberg et al. | 174/102 SC |
| 3,487,455 | 12/1969 | Laurell et al. | 174/102 SC |
| 3,684,644 | 8/1972 | Snell | 428/355 X |
| 3,876,454 | 4/1975 | Snell et al. | 174/84 R X |
| 3,950,604 | 4/1976 | Penneck | 174/73 R X |

FOREIGN PATENT DOCUMENTS

| 1177394 | 1/1970 | United Kingdom | 174/73 R |
| 1294665 | 1/1972 | United Kingdom | 174/73 R |

Primary Examiner—Laramie E. Askin
Attorney, Agent, or Firm—Parmelee, Johnson, Bollinger & Bramblett

[57] ABSTRACT

A stress-relieving material for the surface of an insulated electrical conductor consists essentially of a cold-flowable, low viscosity, corona-resistant elastomer containing from about 350 to about 600 parts by weight per hundred of elastomer of a semiconductor material and up to about 10 parts per hundred of elastomer of processing aids.

8 Claims, 4 Drawing Figures

SHIELDED ELECTRICAL CONDUCTOR TERMINATIONS AND METHODS OF MAKING SAME

This application is a continuation of application Ser. No. 567,440, filed Apr. 11, 1975, now abandoned.

This invention relates to an elastomeric material which relieves stress along the surface of an insulator, especially an insulated conductor of power cable terminals.

In an electrical conductor shielded with an insulator, such as high-voltage electrical cables, it is known that there is a discontinuity or stress in the electrical field at any point where the shield is terminated. When the discontinuity or electrostatic potential gradient exceeds a predetermined value along the surface of an electrical insulator surrounded by any gas, including air, gas discharge, that is, a corona effect, occurs to generate ozone and other gases which degrade the surface of the electrical insulation and puncture or crack the insulation. As examples, this phenomenon is especially troublesome in high voltage generator coils, at the point where the coils emerge from the grounded stator, at the foil edges of foil-wound condenser bushings, and especially in high voltage cables. Ultimately, stress-induced corona discharge causes puncture failure of the shielded electrical components.

The corona effect can be prevented by equalizing the potential gradient along the surface of an insulated conductor. Virsberg et al U.S. Pat. No. 3,066,180 employs a semiconductor or material with voltage-dependent resistivity, e.g., silicon carbide, in a solid resinous thermosetting or air-drying binder, such as an epoxy resin or an oil-modified alkyd resin. However, the Virsberg et al compositions require lengthy curing cycles and the resulting coating is essentially a thermoset material which is relatively inflexible and, once cured, is incapable of flowing to mend any discontinuities in the treated insulated cable.

Suelmann U.S. Pat. No. 3,210,460 describes the use of a semiconducting coating or paint to terminate a grounded shield in an attempt to overcome problems caused by air pockets and the inherently rough surface obtained when conventional stress cone constructions are used. The paint is a liquid film-forming varnish composition, such as epoxy modified urea or melamine-formaldehydes, or modified phenol-formaldehyde resins filled with particulated non-linear silicon carbide. The varnish is applied from a solvent, e.g., toluene, so that solvent residues may create weak points in the coating unless the solvent is removed by a separate drying step. Moreover, application of the coating in the form of a varnish limits the thickness of the coating which can be applied readily. The resins also require a long cure cycle and are incapable of mending themselves if a discontinuity occurs in the coating thereof.

Berg et al U.S. Pat. No. 3,210,461 teaches the use of a mixture of silicon carbide and carbon in a resinous coating, e.g., chlorofluorocarbon resins, and states that non-linear silicon carbide as the sole semiconductor material in the resin gave rapid erosion due to aging and corona attack.

Oatess et al U.S. Pat. No. 3,317,655 teaches the use of a heat-shrinkable stress-relief cone to provide an increased wall of insulation at a conductor discontinuity or an increased cross-section whereby electrical lines of force are distributed. Graphite and acetylene black are disclosed as suitable semiconductor materials for this application. It will be apparent that shrinkable cones are an improvement over hand-built cones or over molded or cast stress-relief cones, which may not necessarily provide a tight fit over the insulated area, but it is also apparent that the Oatess cones, once shrunk into position over a terminal, are incapable of further readjustment if the cone is eroded by corona discharge or otherwise.

Salahshourian U.S. Pat. Nos. 3,631,519 and 3,644,662 and Anderson U.S. Pat. No. 3,396,231 teach the use of a semiconducting layer, e.g., nylon tape impregnated with carbon black or polyethylene or butyl rubber having incorporated therein carbon black, as suitable for application over the surface of a shielded conductor. However, the carbon-filled rubber material must be extruded over the conductor, whereas the impregnated nylon tape does not necessarily prevent discontinuities in the semiconductor layer around the insulated cable.

Peterson U.S. Pat. No. 2,446,387 also teaches the use of a resinous coating containing semiconductor material, especially graphite, acetylene black and metallic powder, to the surface of an insulated conductor, but the resinous coatings are applied in the form of a dispersion or varnish, so that the presence of a residual amount of solvent can create a problem as can the limited thickness of the coatings obtained.

In many of the foregoing references, there is an additional layer of semiconductor and resin between the conductor and cable, but it will be appreciated that this layer is ineffective for preventing stresses and corona effect at the terminals of such a shielded cable. Bower U.S. Pat. No. 2,090,510 and Shiga et al U.S. Pat. No. 3,749,817 indicate systems and compositions appropriate for a semiconductor layer between the conductor and the insulator.

Among the objects of the invention is the provision of materials and devices for application to the terminals of shielded electrical conductors which are easy to apply, which provide flexible long-lived protection to the shielded conductors, which are self-mending, and which are highly resistant to stress-induced breakdown.

It has been found, in accordance with this invention, that a stress-relieving material for the surface of an insulated electrical conductor which fills all of the foregoing needs consists essentially of a cold-flowable, low viscosity, corona-resistant elastomer selected from the group consisting of ethylene-propylene copolymers, isobutylene-isoprene copolymers (butyl rubber), polybutene, chlorosulfonated polyethylene, ethylene-propylene-diene terpolymers and mixtures thereof containing from about 350 to about 600 parts by weight per hundred of elastomer of a semiconductor material and up to about 10 parts per hundred of elastomer of processing aids.

It has further been found, according to this invention, that a stress-relieving laminated device for application to the terminal of a shielded electrical conductor consists of a high voltage insulating tape member, capable of applying compressive force to said terminal, to which is bonded on a portion of one side thereof a stress-relieving material as above.

Thus, in accordance with this invention, a method of preventing corona-induced failure at a terminal of a shielded electrical conductor consists of winding around the circumference of the insulation of the shielded electrical conductor and toward the insulated surface thereof, the stress-relieving surface of a laminated device, as above, until the stress-relieving material is exhausted, reversing the high voltage insulating tape member of said device and wrapping said member back over itself and said insulated surface.

Further, in accordance with this invention, corona-induced failure at a terminal of a shielded electrical conductor is prevented by applying around the circumference of the insulator of the shielded electrical conductor a pad of cold-flowable corona-resistant stress-relieving material and overlaying the pad with a compressive member.

In another aspect, this invention relates to a shielded electrical conductor terminal resistant to corona-induced failure consisting of an electrical conductor, electrical insulation disposed about said conductor, and stress-relieving material cold-flowed about said insulation by compressive force of a high voltage insulating tape member.

Other objects, advantages and features of the present invention will become apparent from the accompanying description and drawings, which are merely exemplary.

Figure 1:
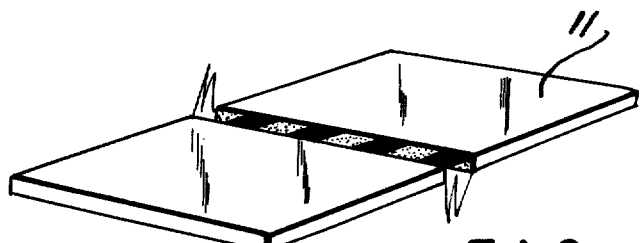
FIG. 1 is a broken perspective view of a pad of stress-relieving material in accordance with the present invention.

Referring to FIG. 1, the pad 11 consists of a flat piece, which can be varied in thickness up to about 100 mils and which is fabricated from a cold-flowable corona-resistant elastomer containing semiconductor material and processing aids.

Figure 2:
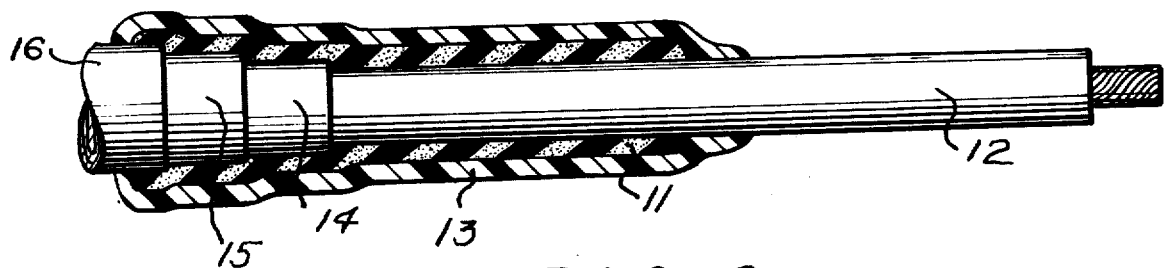
FIG. 2 is a view partially in section showing a method of preventing corona-induced failure at a terminal of a shielded cable.

Utilization of the pad to prevent corona-induced failure at a terminal of a shielded electrical cable is shown in FIG. 2, wherein the pad 11 is wrapped around the insulated surface 12 of the shielded conductor and overlaid with a compressive insulating member 13, such as high voltage insulating tape. In FIG. 2, the cable insulation shield is shown by 14, the copper or other conducting tape shield by 15 and the cable jacket by 16. It will be appreciated that FIG. 2 also illustrates a shielded electrical conductor resistant to corona-induced failure, wherein 12 represents electrical insulation disposed about the conductor, and 11 represents stress-relieving material cold-flowed about said insulation by compressive force of a high voltage insulating tape member 13.

Figure 3:
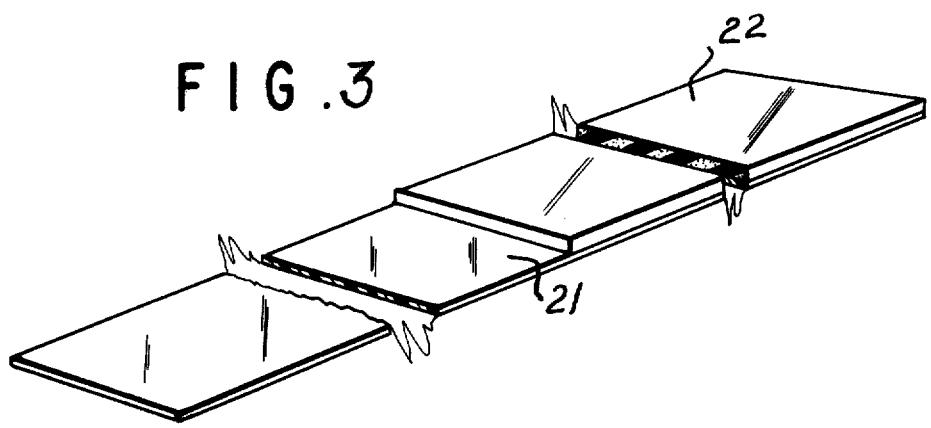
FIG. 3 is a broken perspective view of a stress-relieving laminated device for application to the terminal of a shielded electrical conductor.

A stress-relieving laminated device according to this invention is shown in FIG. 3, wherein 21 represents a high voltage insulating tape member, capable of applying compressive force to a terminal of an insulated cable, which is bonded to a portion of one side of a stress-relieving material 22. It will be appreciated that the embodiment shown in FIG. 3 is that in which the stress-relieving material is not bonded over the entire surface of the portion of the high voltage insulating tape member.

Figure 4:
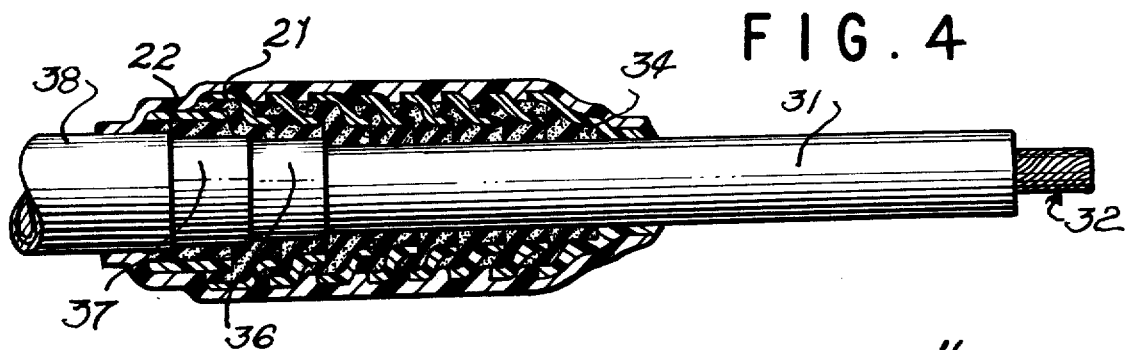
FIG. 4 is a view partially in section of another method of using a stress-relieving laminated device.

The application of the stress-relieving laminated device of FIG. 3 is shown in FIG. 4, wherein the circumference of the insulator 31 of the shielded electrical cable 32 is wound with the device of FIG. 3, with the stress-relieving surface 22 of the device next to the insulator 31, until the stress-relieving material is exhausted as at 34, whereupon the compressive insulating tape member 21 can be reversed and wrapped back over itself and over the insulating surface. Also shown in FIG. 4 are a cable insulation shield 36, a copper tape shield 37 and cable jacket 38. It will be understood that FIG. 4 further illustrates the shielded electrical conductor of this invention, protected against corona-induced failure, wherein 31 represents electrical insulation disposed around the conductor, and 22 represents stress-relieving material cold-flowed about the insulation by compressive force of a high voltage insulating tape member 21.

"Cold-flowable corona-resistant elastomer," as used in the specification and claims, includes elastomers selected from the group consisting of ethylene-propylene copolymers, isobutylene-isoprene copolymers (butyl rubber), polybutene, chlorsulfonated polyethylene, ethylene-propylene-diene terpolymers and mixtures thereof.

Typical of the ethylene-propylene copolymers useful in the practice of this invention is "Vistalon 404," a product of Exxon Corporation, which has a specific gravity of 0.86 and Mooney viscosity MLI 8 (212° F.) of 35 to 45.

Exemplary of isobutylene-isoprene copolymers (butyl rubber) useful in the practice of this invention is "Butyl 065," a product of Exxon Corporation. This material contains approximately 99% of isobutylene monomer units and 1% of isoprene units and has a molecular weight in the 350,000 range.

An ethylene-propylene-diene terpolymer typical of those useful for purposes of this invention is "Nordel 1320," a product of E. I. DuPont de Nemours & Co. This material has a specific gravity of 0.85. Also typical of ethylene-propylene-diene terpolymers usable in the practice of this invention are "Nordel 2722" and "Nordel 2522," also products of E. I. DuPont de Nemours & Co. Ethylene-propylene-diene terpolymers are the preferred elastomer at high loadings of semiconductor materials, that is, from about 350 to about 600 parts per hundred parts of elastomer.

Representative of polybutenes (polyisobutylene) useful in making the stress-relieving materials of this invention are "Indopol H1500," a product of Amoco Chemical Co., and "Oronite 32E," a product of Chevron Chemical Co., having a molecular weight of about 1500–2000. Frequently, a polybutene of this molecular weight range is combined with one of the polymers discussed above to improve the "tack" and adhesiveness of the resulting blend.

A preferred blend for the purposes of this invention consists of an isobutylene-isoprene copolymer, containing at least about 99% of isobutylene monomer units and having a molecular weight above about 300,000, and a polybutene havng a molecular weight between about 1000 and 2000. The isobutylene-isoprene polymer and polybutene are used in weight ratios varying from 1:0.8 to 1:1.

"Semiconductor material," as used in the specification and claims, includes non-linear silicon carbide and other n-type semiconductor materials having similar non-linearity of resistivity. Non-linearity of resistivity of silicon carbide or other semiconductor powders is determined by measuring the voltage at various currents in a cylindrical column 1-inch in diameter. The powder is packed in the column between a pair of electrodes at a pressure of 400 pounds per square inch. The current is then proportional to the voltage raised to a power, in accordance with the equation: $I=kV^n$. For satisfactory stress-resistant materials, the value of n should exceed about 2. It should be understood that materials with n values as high as 7 are commercially available.

In other terms, the volume resistivity of the n-type semiconductor materials used in this invention can vary from a few to several million ohm centimeters.

Although the value of n is related to particle size, it is to be understood that any particle size from about 100 mesh to about 1000 mesh is satisfactory for the practice of this invention. However, particles in the 400 to 600 mesh range are preferred.

Typical of the silicon carbide products useful in the practice of this invention is "Crystalon," a product of Norton Co.

It will be understood that "silicon carbide" having the requisite behavior is, in fact, silicon carbide containing some of carbon, phosphorus or aluminum impurities, and that pure silicon carbide is not a semiconductor for the purpose of this invention.

The amount of semiconductor used in the stress-relieving materials of this invention is varied from about 350 to about 600 parts by weight per hundred parts of elastomer. However, loadings of from about 400 parts to about 500 parts of semiconductor per hundred parts of elastomer are preferred.

Among the processing aids, isopropyl tri-isostearic titanate is a preferred stabilizer in the range of 0 to 10 parts by weight per hundred parts of elastomer. This material is known as "Ken-React TTS," obtainable from Kenrich Petrochemical, Inc., Bayonne, N.J.

"Compressive member" and "high voltage insulating tape member," as used in the specification and claims, are synonymous and include electrically insulating materials which have sufficient strength to exert the required compressive force on the stress-relieving material placed or wound around a shielded conductor. Typical of materials used in this function is tape 30 mils in thickness prepared from "Vistalon 3708," a trademark of Exxon Corporation, an ethylene-propylene-diene terpolymer having a specific gravity of 0.86. The tape composition also contains clay-silicate filler and carbon black.

As one example, the stress-resistant material was made by milling together:

| Parts by Weight | |
|---|---|
| 100 | isobutylene-isoprene copolymer (350,000 molecular weight) |
| 6 | isopropyl tri-isostearic titanate |
| 400 | silicon carbide (600 mesh) |
| 80 | polybutene (1500 molecular weight, Chevron Chemical Co.) |

The product, fabricated according to FIGS. 1, 2, 3 and 4, provided good protection against corona effects in terminal areas of shielded electrical cables.

It is to be understood that numerous changes may be made without departing from the spirit of the invention except as defined in the appended claims.

What is claimed is:

1. Method of preventing corona-induced failure at a terminal of a shielded electrical conductor, the conductor having an insulated surface, comprising the steps of winding a high voltage insulating tape member around said insulated surface of said shielded electrical conductor, said high voltage insulating tape member being capable of applying compressive force to said terminal, said high voltage insulating tape member having a corona-resistant electrical stress-relieving material bonded to a portion of the length of one side of said insulating tape member, said insulating tape member being wound such that said stress-relieving material is toward said insulated surface, said winding progressing in one direction along said insulated surface until said stress-relieving material is exhausted; reversing the direction of progression of the high voltage insulating tape member and wrapping said member back over itself and said insulated surface.

2. The method of claim 1, wherein the winding step is done by half-lapping.

3. The method of claim 1, wherein the stress-relieving material is a cold-flowable corona-resistant elastomer selected from the group consisting of ethylene-propylene copolymers, isobutylene-isoprene copolymers, polybutene, chlorosulfonated polyethylene, ethylene-propylene-diene terpolymers and mixtures thereof containing from about 350 to about 600 parts by weight per hundred of elastomer of a semiconductor material and up to about 10 parts per hundred of elastomer of processing aids.

4. The method of claim 3, wherein said corona-resistant electrical stress-relieving material contains up to about 10 parts by weight per hundred of elastomer of titanate stabilizer.

5. Method of preventing corona-induced failure at a terminal of a high voltage shielded electrical conductor, the conductor being covered on the exterior thereof by an insulator and said insulator being covered on the exterior by a conductive shield which terminates short of the end of said insulator with a length of the surface of said insulator being exposed beyond the end of the conductive shield, comprising the step of winding a high voltage insulating tape member around the end portion of said conductive shield and around said insulator surface proximate to the end of said conductive shield, said high voltage insulting tape member being capable of applying compressive force to said terminal, said high voltage insulating tape member having a corona-resistant electrical stress-relieving elastomeric material bonded to a portion of the length of one side of said insulating tape member, said insulating tape member being wound such that said stress-relieving elastomeric material underlies said tape member in contact with said end portion of the conductive shield and in contact with said insulator surface proximate to the end of said conductive shield, said winding progressing in one direction along said end portion of said conductive shield and said insulator surface unitl said stress-relieving material is exhausted.

6. In a high voltage electrical terminal having an electrical conductor covered on the exterior thereof by an insulator and wherein said insulator is covered on the exterior by a conductive shield which ends short of the end of said insulator with a length of the surface of said insulator extending beyond the end of said conductive shield, a corona-resistant stress-relieving termination for said terminal comprising: a flexible high voltage insulating tape member, a layer of cold-flowable corona-resistant electrical stress-relieving elastomeric material bonded to at least a portion of one side of said tape member, said tape member being wrapped in overlapping relationship about the end portion of said conductive shield and also about the surface of said insulator beyond the end of said conductive shield with said layer of cold-flowable elastomeric material underlying said tape member in direct contact with the end portion of the conductive shield and in direct contact with the insulator surface beyond the end of said conductive shield, said tape member after being wrapped thereon applying continuing compressive force to the underlying stress-relieving material for cold-flowing said elastomeric material about the surface of said insulator and for providing self-mending capability, and said elastomeric material containing from about 350 to about 600 parts by weight per hundred parts of elastomeric material of a semi-conductor powder in which the voltage when measured at various currents in a cylindrical column of powder 1-inch in diameter packed at a pressure of 400 pounds per square inch is in accordance with the equation: $I = kV^n$ wherein the value of "n" exceeds about 2.

7. In a high voltage electrical terminal having an electrical conductor covered on the exterior thereof by an insulator and wherein said insulator is covered on the exterior by a conductive shield which ends short of the end of said insulator with a length of the surface of said insulator extending beyond the end of said conductive shield, a corona-resistant stress-relieving termination for said terminal comprising: a flexible high voltage insulating tape member, a layer of cold-flowable corona-resistant electrical stress-relieving elastomeric material bonded to at least a portion of one side of said tape member, said tape member being wrapped in overlapping relationship about the end portion of said conductive shield and also about the surface of said insulator beyond the end of said conductive shield with said layer of cold-flowable elastomeric material underlying said tape member in direct contact with the end portion of the conductive shield and in direct contact with the insulator surface beyond the end of said conductive shield, said tape member after being wrapped thereon applying continuing compressive force to the underlying stress-relieving material for cold-flowing said elastomeric material about the surface of said insulator and for providing self-mending capability, said elastomeric material containing from about 350 to about 600 parts by weight per hundred parts of elastomeric material of a semi-conductor powder in which the voltage when measured at various currents in a cylindrical column of powder 1-inch in diameter packed at a pressure of 400 pounds per square inch is in accordance with the equation: $I = kV^n$ wherein the value of "n" exceeds about 2, and said elastomeric material being a mixture of isobutylene-isoprene copolymer and polybutene.

8. An electrical stress-relieving termination as claimed in claim 7 wherein the weight ratio of said isobutylene to said polybutene is in the range of about 1:0.8 to about 1:1.

* * * * *